Dec. 12, 1939.  H. MANRODT ET AL  2,183,122
COMBUSTION ENGINE WITH ROTARY VALVE
Original Filed Dec. 7, 1936    3 Sheets-Sheet 1

INVENTORS
Henry Manrodt and
Manfred Manrodt
BY
Mark H. Ordmann
ATTORNEY

Patented Dec. 12, 1939

2,183,122

UNITED STATES PATENT OFFICE 2,183,122

COMBUSTION ENGINE WITH ROTARY VALVE

Henry Manrodt, Newark, N. J., and Manfred Manrodt, Baltimore, Md.

Application December 7, 1936, Serial No. 114,570
Renewed April 18, 1939

28 Claims. (Cl. 123—190)

The present invention relates to internal combustion engines and has for its main object the provision of a balanced rotary valve to replace the common inlet and exhaust valves hitherto used with internal combustion engines and to control all cyclic operations of the engine during a single revolution thereof.

Another object of this invention is to provide a single valve for a multiple cylinder engine that will operate as a common control of the cyclic operations in a number of cylinders during a single revolution.

A still further object is to provide a valve and cylinder head construction whereby expansion of said valve during operation will be compensated without impairment of the effectiveness of the valve seal.

A still further object is to provide a valve construction which will be thoroughly air-cooled.

A still further object is to provide a valve construction in which the fuel inlet and air passages leading from the carburetor to the cylinders will be rendered perfectly tight.

A further object of this invention is to provide a construction whereby the area of the valve subjected to irregular pressure during compression and explosion will be reduced to a minimum.

Another object is to provide a valve which will revolve in a stationary annular track with a minimum of friction.

According to the present invention the various essential parts are so arranged that they are capable of expanding with uniform or varying coefficients without impairing the perfect seal between the cylinders and the intake or exhaust chambers, and a perfect balance of all forces tending to lift or displace any moving parts is effected, whereby free and easy operation of the engine is assured.

With these and other objects in view, our invention consists in the novel construction, combination and arrangement of parts as will be hereinafter more fully described and defined in the appended claims.

In the accompanying drawings which form part of this specification and in which similar reference characters denote corresponding parts:

Fig. 1a is a section along line Ia—Ia of Fig. 2 showing the connection of one of the exhaust pipes to the valve;

Fig. 4 is a vertical section through line 4—4 of Fig. 2;

Figure 1:
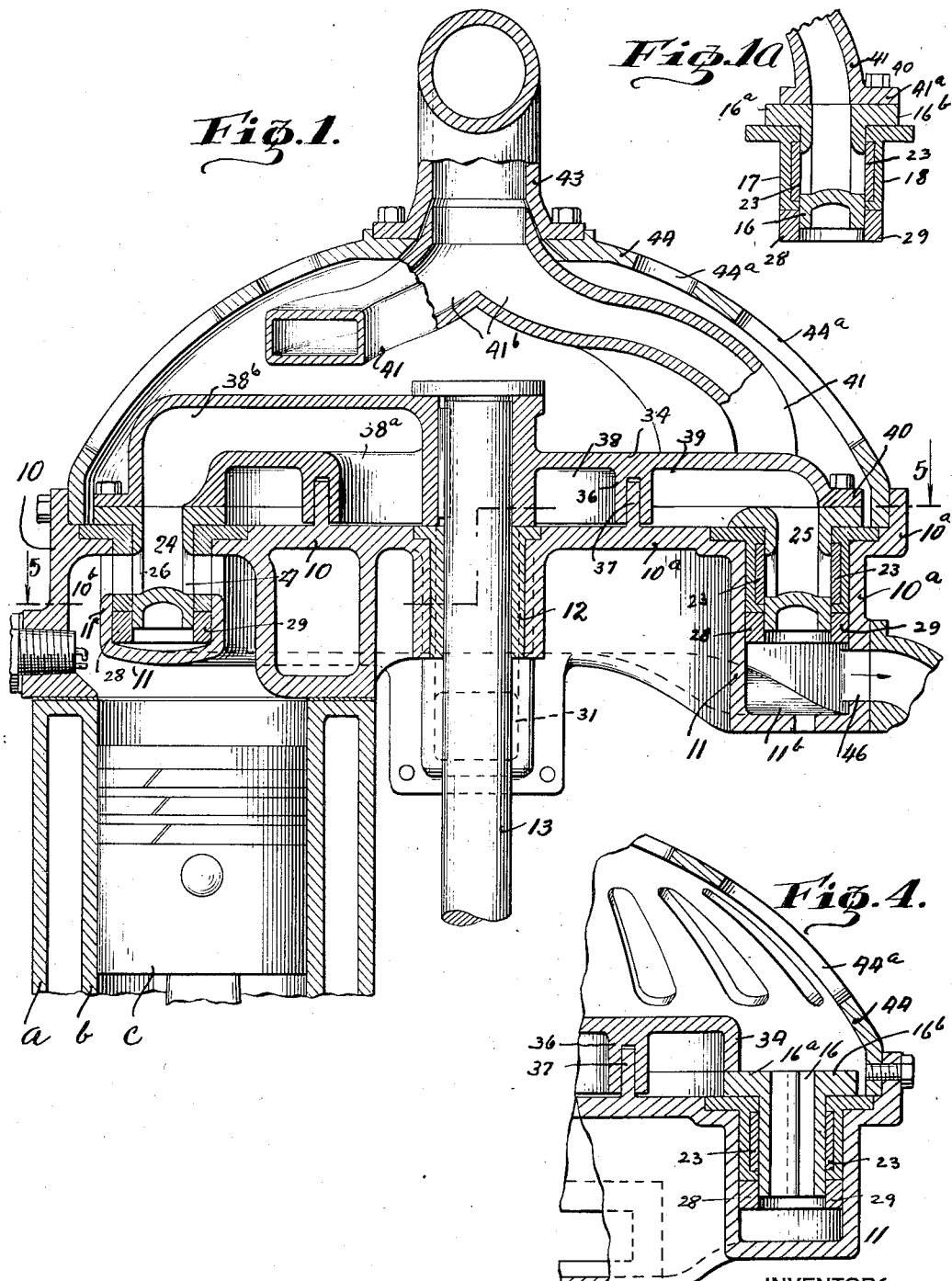
Fig. 1 is a vertical section through the cylinder head on line I—I of Fig. 2 and one of the cylinders, showing the valve revolubly supported on said cylinder head.

In the drawings, by way of example $a$ denotes the cylinder block of a six cylinder motor of which only three cylinders $b$ are shown, and which engine, as far as crankcase, crank shaft, pistons, ignition and lubrication, etc. are concerned, is of usual construction. The pistons $c$ in the cylinders have the usual four cycle operations, that is, suction, compression, explosion and exhaust strokes.

Figure 2:
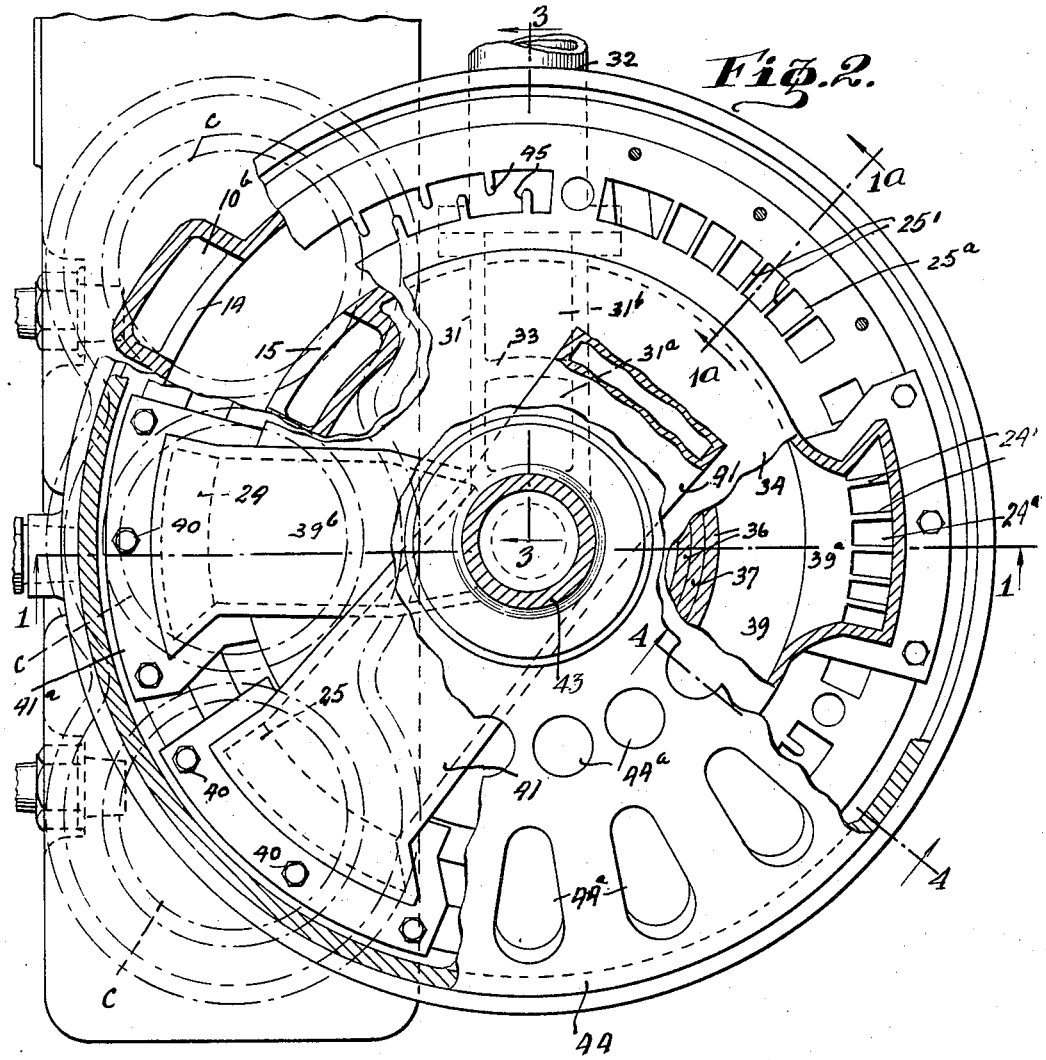
Fig. 2 is a top plan view of the cylinder head partly in section and broken out to show the annular track, the valve borne therein and the intake and exhaust pipes connected to said valve.
Figure 5:
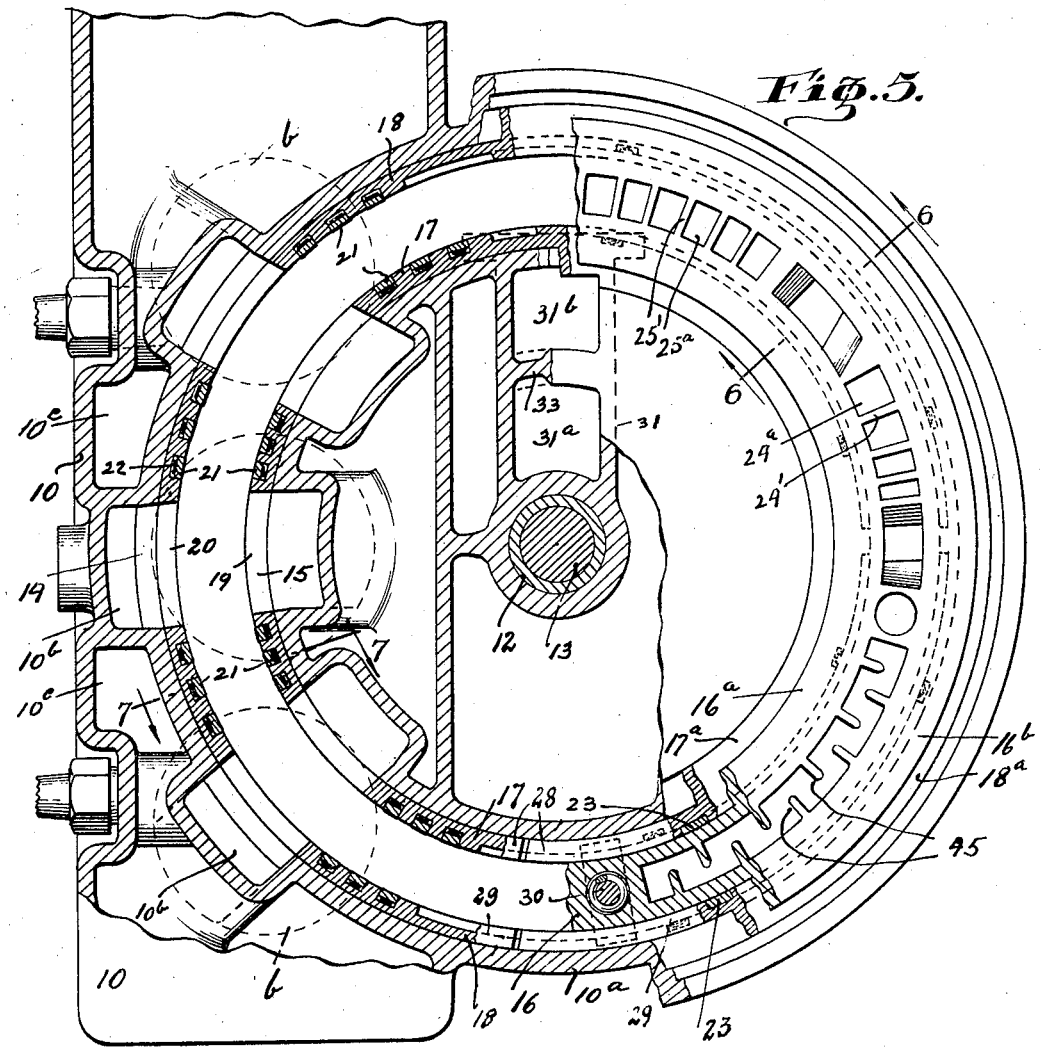
Fig. 5 is a horizontal section along line 5—5 of Fig. 1, the valve being partly cut away.
Figure 6:
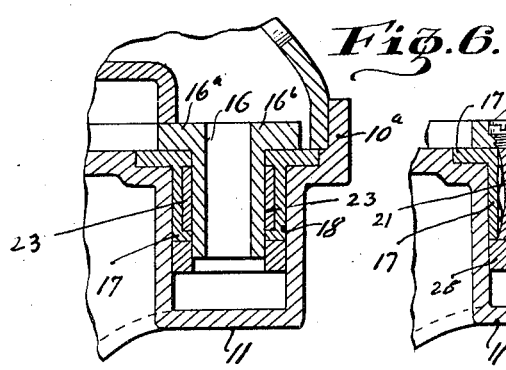
Fig. 6 is a vertical section along line 6—6 of Fig. 5.
Figure 7:
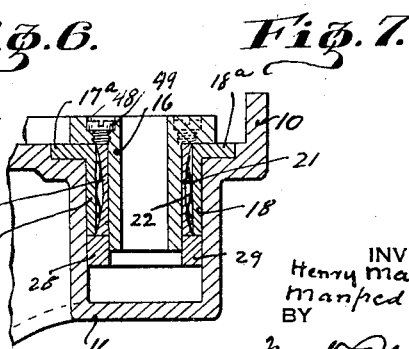
Fig. 7 is a similar section along line 7—7 of Fig. 5; all sections being views in the directions of the arrows of the respective section lines.

The essential novel feature of our invention resides in the provision of a fully balanced rotary valve which is adapted to control successively the cyclic operations of the pistons in one or a plurality of cylinders and, thus, eliminate the hitherto used separate intake and exhaust valves. To this end, the cylinder head 10, adapted to be tightly fixed to the cylinder block in well known manner, is extended laterally relative to said cylinder block in horizontal direction, its top forming a perfectly flat plate or disk, as shown in Figs. 1, 2 and 5. In the present example it is assumed that a single valve can be used to serve three cylinders and, therefore, for a six cylinder engine two such cylinder heads may be provided. In fact a single valve may serve as many cylinders as can be covered by one annular groove or track. Such cylinder head is provided with an annular groove or track 11 of U-shaped cross-section. This track 11 projects inwardly or downwardly from the top of the cylinder head toward the cylinders and serves to accommodate a single annular valve. For a six cylinder motor, in which the cylinders are arranged in a single straight row, the two tracks will extend excentrically and transversely of said cylinders, as shown in Figs. 2 and 5 (one track being shown). The circumferential walls 11a of the track 11 project downwardly into the hollow spaces 10b of the cylinder head 10 provided above each cylinder and, as usual, serving as combustion chambers. Rotatively mounted in a bushing 12 fixed in the cylinder head, centrally relative to the track, is a vertical shaft 13, which shaft is adapted to be suitably impelled from the crank shaft by any suitable means (Fig. 1). The bottom 11ᵇ of said track has a downward slant toward the extended portion 10ᵃ of the cylinder head (Fig. 1) for the purpose to be hereinafter specified. The parts of the annular side walls 11ᵃ of the track 11 projecting into said combustion spaces 10ᵇ above each cylinder are provided with a plurality of ports or openings 14, 15, serving as intake and exhaust for said cylinders. There are one or more such intake and exhaust ports for each cylinder. For the purpose of affording an effective balance of the forces acting on the valve, we arrange said ports for each cylinder in pairs and in diametric opposition in the inner and outer walls and of even size, as will be more fully described.

Figure 3:
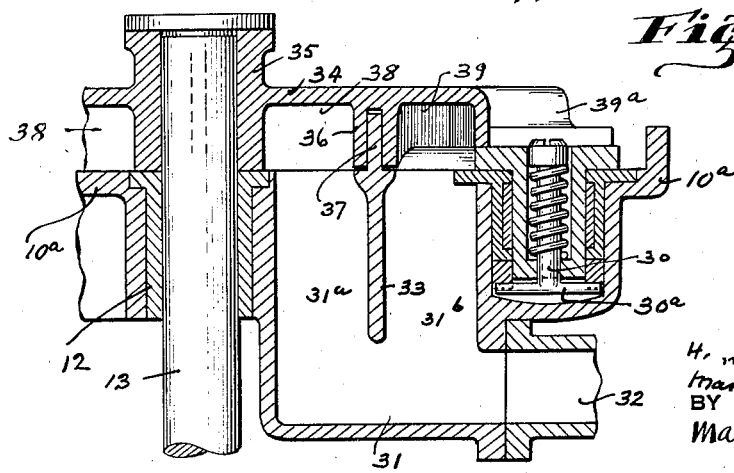
Fig. 3 is a vertical section through line 3—3 of Fig. 2.

The valve proper consists of a hollow ring-shaped body 16 which, except for suction and exhaust chambers provided therein, is open both on top and bottom. The walls of said valve body extend into the track 11 and are formed on top with annular laterally extending flanges 16ᵃ, 16ᵇ, respectively, whose lower faces are adapted to slidably bear on flat perfectly polished annular seats. These seats are formed on top of the cylinder head, or by lateral rims or flanges 17ᵃ and 18ᵃ of a pair of inner and outer annular lining sleeves 17, 18, snugly fitted in the side walls of and extending downwardly into the track (Figs. 1, 3, 4). These rims are fixed by screws or otherwise to the cylinder head to form a unit with said track. The inner and outer sleeves 17, 18, are formed on their circumferences with openings 19, 20, which coincide with the ports 15, 14 in the track. The inner and outer lining sleeves may, however, be omitted and the upper parts of the side walls of track 11 be extended to project toward the valve body to take the place of said linings.

At each side of said openings 19, 20, and 14, 15, respectively, are provided suitable packing strips 21 which are resiliently borne in vertical grooves 22 and extend substantially the full length of said lining sleeves to effectively bear against the circumferential walls of the valve body 16 and serve the same purpose as piston rings. In addition, cylindrically shaped or segmental packing rings 23 may be provided to extend around the valve body, particularly around the part of the track located in the extension 10ᵃ thereof, so as to effectively press against the valve body and prevent the escape of gases laterally due to centrifugal force.

The valve body in the present example is formed with two intake and two exhaust chambers 24, 24ᵃ, 25, 25ᵃ the chambers of each pair being arranged at diametrically opposite sides of the annular valve. By using a pair of each of such chambers we are able to have the valve control the cycles of each cylinder twice during one revolution. Each chamber is formed with diametrically opposed ports 26, 27, which are adapted during operation of the valve to be brought into range with the ports 14, 15. Around the lower ends of the valve are mounted resilient packing members 28, 29, such as split rings, that are tightly but resiliently adapted to bear against the lower faces of the linings 17 and 18 (Figs. 1 and 5).

Thus, while with the packing strips 21 and rings 23 there is air tight closure of the valve in lateral direction, an air tight closure at the top is produced by the flat valve seat and at the bottom is produced by the two rings 28, 29. These rings are attached to the valve body at several places by spring influenced screw bolts 30 (Fig. 3) formed with heads 30ᵃ which may be made to engage notches in said rings and press the latter against said linings. In this manner the rings 28, 29 are fixed to the valve body to revolve with the latter while they effectively tighten the valve against escape of the gases in vertical direction. These rings may be either solid or split rings or may consist of a number of parts. In the latter case the inner and outer rings or ring parts are kept together and pressed against the valve by means of springs located between said ring parts. The whole arrangement may also be made so that the rings 28 and 29 are stationary, kept airtight against the edges of the lining sleeves and pressed against the rotating valve either by their own spring force when split, or by special springs. In either case the space between the valve and walls of the track above the cylinders must be airtight in all directions.

Inasmuch as the valve is adapted to serve all cylinders at least twice during a single rotation, we provide a plurality of suction pipes and exhaust pipes, in the present embodiment two of each of said pipes are provided. These pipes must be so constructed that the suction in one pipe does not effect the suction in the other pipe. To this end, we provide an intake chamber 31 (Fig. 3) below the extended part 10ᵃ of the cylinder head into which terminates the stationary intake pipe 32 leading from the carburetor (not shown). This chamber is divided by a partition 33 into two compartments 31ᵃ, 31ᵇ of equal cross-sectional area. Extending above the cylinder head is an inverted disk or pan-shaped body 34 having a central hub 35 which is keyed or otherwise fixed to the shaft 13 to revolve with it. This pan is formed on the inner face of its top with a concentrical downwardly projecting annular grooved flange 36 which is adapted to slidably engage a concentric annular projection 37 projecting from the cylinder top. These interengaging flanges divide the interior of said disk into two annular channels 38, 39. The two compartments 31ᵃ, 31ᵇ formed by the partition 33 communicate separately with said annular channels in the casing. The hub 35 shuts off the inner chamber toward the center and the flanges of the revolving valve tightly bearing and revolving on the well lubricated surfaces of the valve seats serve as a tight seal toward the outer side of said annular chambers. Any special partitions or walls that would cause friction and require lubrication are thus eliminated.

The outer annular channel 39 is provided with a radially extending passage or lead 39ᵃ (Fig. 2) which extends over and terminates into one of the intake chambers 24ᵃ of the valve. The inner annular channel 38 through a passage 38ᵃ communicates with a lead 38ᵇ formed integral therewith and extending radially in opposite direction to lead 39ᵃ and over the top of said casing to the second chamber 24. Said leads 38ᵇ, 39ᵃ are fixed to the rims or flanges of the valve body by bolting or the like, as at 40, packings or gaskets (not shown) being provided to effect complete sealing of the fuel feed. By this connection between the pan and the valve body, the latter becomes coupled to the shaft 13 and is impelled through said shaft.

The cross sectional areas of the suction passageways from intake pipe 32 to the intake chambers in the valve body must be uniform throughout.

While a small play must be provided between the surfaces of the interengaging annular flanges 36 and 37 to prevent friction, such play will form a labyrinth seal between the chambers. However, because of the identical nature of the mixture in each of the annular chambers, slight leakage is not important.

Extending over the channelled pan 34 are also two exhaust pipes 41. The outer ends 41a of these pipes, like those of the suction pipes, are fixed to the rims of the valve body, as at 40, over the corresponding exhaust chambers 25, 25a. At their opposite ends 41b they taper to form a single pipe outlet which freely terminates into a common stationary pipe 43 or chimney fixed to a dome-shaped cover or lid 44. This lid is stationarily fixed to the cylinder head and is provided all around its circumference with wide recesses 44a forming air passages.

Owing to the fact that the valve body is open on top and bottom except at the inlet and exhaust chambers and at the places where the packing rings 28, 29 are bolted to said valve, free ventilation of air for cooling purposes through said valve body is afforded. The cooling surfaces are enlarged by cooling ribs 45 extending radially from the opposite inner walls (Figs. 2 and 5).

The clearance between the bottom of the annular track 11 and the bottom of the revolving valve in the portion over the cylinder block is small but gradually enlarges in the extension 10a, as shown in Fig. 1. All air needed for the fuel mixture is sucked up through the recessed dome and passes through valve and track and a vent 46. This vent leading into the carburetor (not shown) is arranged somewhat above the bottom of the track, in order to prevent oil accumulating on the bottom from being sucked along with the air. The down draft through the valve serves to cool the walls of the valve and simultaneously the air needed for the fuel mixture is preheated. It is, of course, clear that air cooling may be effected in a different manner.

In order that only so much of the respective intake and exhaust chambers be in effective action as coincide with the corresponding stationary cylinder openings, said intake and exhaust chambers 24, 24a and 25, 25a are divided by partitions 24', 25' into a number of small compartments. By virtue thereof, undue suction or effect of the exhaust gases in any one of said chambers on other cylinders is avoided.

To equalize the pressures through the opposite ports in the track 11 and valves, the ports in the outer and inner walls are all made of exactly the same dimensions. Since, however, the outer ports of the valve reach the corresponding ports in the track later than the inner ports, the outer ports of the valve are extended in the direction of travel to a corresponding degree, thereby insuring simultaneous arrival of the outer and inner ports of the valve relative to those of the track. Thus, the opposing pressures on the opposite walls of the valve during compression and explosion strokes are always equal and balance each other.

The same result may, of course, be obtained in a reverse manner, by having the openings in the track even at one end and uneven at the opposite end (relative to the direction of rotation of the valve) and the valve ports extended at the rear end, or it may be obtained in any other suitable manner.

The dimensioning of the exhaust and intake chambers of the valve depend, of course, upon the requisite operating conditions. The present example shows such chambers so arranged that the exhaust valve opens 36° before the lower dead point of the engine crank and closes at its upper dead point. The track ports then remain closed for 6° of rotation beyond the upper dead point and then the ports are opened for suction, closing again 16° beyond the lower dead point of the crank. Thus, exhaust occurs during a 216° rotation of the crank and intake suction during a 190° rotation thereof. The rotary shaft 13 and the valve are adapted according to the present embodiment to make one revolution for each four revolutions of the crank shaft.

The gearing ratio and periodic control of intake and exhaust by the valve, however, are matters of choice depending upon required operating conditions. Requisite lubrication of the valve may be effected in well known manner.

Suitable openings 48 in the flanges of the valve rim and closure means 49 therefor are provided for the insertion of the vertical packing strips to facilitate the mounting of the valve in the cylinder head.

The use of air cooling which is afforded by the novel structure of the valve is very important and preferable to water cooling which entails the difficult sealing problem between the stationary water supply pipes and the revolving parts, without using a complicated packing system.

With our novel structure, it will be seen, the valve is indirectly water-cooled as it passes the water jackets 10c provided in the cylinder head. On the other hand, the exhaust leads are exposed to the air freely circulating through the dome and valve body so that the hot exhaust gases and the walls of the valve are thereby effectively air cooled.

The invention is also applicable to engines of the Diesel type or any other type of engine which require closing of the cylinder or cylinders by rotary means for the passage of fuel and exhaust gases.

Various modifications may, of course, be made in the carrying out of our invention without departing from the spirit thereof. We, therefore, do not wish to limit ourselves to the details herein described and shown.

What we claim is:

1. In an internal combustion engine, the combination with a stationary cylinder block including a plurality of cylinders in series, of a cylinder head fixed to said block, an annular valve formed with an annular chamber revolubly mounted in said cylinder head to control all cyclic operations of said engine during a single revolution, said cylinder head being provided with annular cylindrical tracks for said annular chambers, one for each valve controlling a series of cylinders at a time.

2. In an internal combustion engine, the combination with a stationary multiple cylinder block, of a cylinder head adapted to be fixed thereto and formed with an annular hollow open-topped track provided with a plurality of lateral intake and exhaust ports leading into several cylinders of said block and an annular valve revolubly borne in each track and having ports which during a single revolution will periodically coincide with said ports in said track and thereby control all cyclic operation of said cylinders.

3. In an internal combustion engine, the combination with a stationary multiple cylinder block, of a cylinder head adapted to be fixed thereto and formed with an annular hollow open-topped track provided with lateral intake and exhaust ports leading into several of said cylinders of said block and an annular valve revolubly borne in said hollow track and formed with intake and exhaust chambers which periodically will communicate with said ports and thereby control all cyclic operations of said cylinders during each revolution thereof.

4. In an internal combustion engine, the combination with a multiple cylinder block, of a cylinder head adapted to be fixed to said block and having a laterally extended portion, an annular cylindrical track in said cylinder head having a seat at one end and extending excentrically across a number of adjacent cylinders and through said extended portion of said head and a single cylindrical valve formed with an annular chamber and revolubly borne in said track, said valve being adapted to successively control all cyclic operations in said cylinder during each revolution.

5. In an internal combustion engine the combination with a multiple cylinder block, of a cylinder head adapted to be fixed to said block and having a laterally extended portion, a cylindrical, annular track in said cylinder head extending excentrically across a number of adjacent cylinders and through said extended portion of said head, a single cylindrical valve formed with an annular chamber open on top and bottom and revolubly borne in said track and adapted to successively control all cyclic operations in said cylinder during each revolution, a flat seat for said valve provided at the one end of said track, and means at the sides and opposite end of said track for producing a tight seal for said valve.

6. In an internal combustion engine the combination with a multiple cylinder block, of a cylinder head adapted to be fixed to said block and having a laterally extended portion, an annular track in said cylinder head extending excentrically across a number of adjacent cylinders and through said extended portion of said head and a single annular valve revolubly borne in said track and adapted to successively control all cyclic operations in said cylinder during each revolution, said track being formed laterally with ports leading into said cylinders and the annular valve being formed with intake and exhaust chambers having corresponding lateral ports adapted to successively register with the ports in said track during rotation of said valve.

7. In an internal combustion engine the combination with a multiple cylinder block, of a cylinder head adapted to be fixed to said block and having a laterally extended portion, an annular track in said cylinder head extending excentrically across a number of adjacent cylinders and through said extended portion of said head and a single cylindrical valve formed with an annular chamber and revolubly borne in said track and adapted to successively control all cyclic operations in said cylinders during each revolution, said annular valve being formed with intake and exhaust chambers adapted to successively communicate with said cylinders and except for the parts occupied by said intake and exhaust chambers is open both on top and bottom to provide air passages for cooling purposes.

8. In an internal combustion engine the combination with a multiple cylinder block, of a cylinder head adapted to be fixed to said block and having a laterally extended portion, an annular track in said cylinder head extending excentrically across a number of adjacent cylinders and through said extended portion of said head, a single cylindrical valve formed with an annular chamber and revolubly borne in said track and adapted to successively control all cyclic operations in said cylinders during each revolution, and stationary and revolving intake and exhaust pipes, said revolving pipes being integral parts of said revolving valve and air cooled.

9. In an internal combustion engine the combination with a multiple cylinder block, of a cylinder head adapted to be fixed to said block and having a laterally extended portion, an annular track in said cylinder head extending excentrically across a number of adjacent cylinders and through said extended portion of said head, a single annular valve revolubly borne in said track and adapted to successively control all cyclic operations in said cylinders during each revolution, and intake and exhaust chambers in the annular valve partitioned to form individual smaller chambers, for the purpose specified.

10. In an internal combustion engine the combination with a multiple cylinder block, of a cylinder head adapted to be fixed to said block and having a laterally extended portion, an annular track in said cylinder head extending excentrically across a number of adjacent cylinders and through said extended portion of said head, a single annular valve revolubly borne in said track and adapted to successively control all cyclic operations in said cylinders during each revolution, and cooperating horizontal and vertical resilient packing means between said track and said revolving annular valve to form a seal permitting expansion of said valve.

11. In an internal combustion engine according to claim 2, in which said annular valve body is formed with suction chambers and exhaust chambers to control all cyclic operations of said cylinder with the desired frequency during each revolution.

12. In an internal combustion engine, the combination with a cylinder block, of a cylinder head fixed to and extended laterally from said block, a driven shaft revolubly mounted in said head and extending parallel to and laterally from said block, and a single annular valve fixed on said shaft for controlling all cyclic operations of said engine, said cylinder head being formed with an annular cylindrical track concentric with said shaft and having lateral intake and exhaust ports, said valve being revolubly borne in said track and formed with intake and exhaust chambers having corresponding ports adapted to coincide with the ports in said track at certain periods during the rotation of said valve, and intake and exhaust leads fixed to and revolving with said valve.

13. In an internal combustion engine according to claim 12, in which said ports are arranged in pairs both in the inner and outer circumferential walls of said annular cylindrical track and said annular valve, the ports of each pair being diametrically opposed to one another and of equal size to balance the acting forces on the valve.

14. In an internal combustion engine according to claim 12, in which said annular valve is open on top and bottom and provided with lateral cooling ribs projecting from the circumferential walls thereof to enlarge the cooling surfaces of said valve.

15. In an internal combustion engine according to claim 2, in which said valve freely revolves between the walls of said track and the latter is formed with a flat valve seat on the top, and means around the bottom parts of said valve for creating an air tight seal on top and bottom.

16. In an internal combustion engine, a cylinder head formed with a circular track, having ports or passages for intake and exhaust, an annular valve body open on top and bottom revolubly borne in said track and having intake and exhaust ports adapted to periodically coincide with the ports in said track and tightening means mounted around the bottom of and connected to said valve body for creating an air tight seal.

17. In an internal combustion engine according to claim 16, in which said tightening means consists of accessory rings mounted around the bottom walls of said valve body and split to resiliently but tightly bear against the walls of said valve.

18. In an internal combustion engine, the arrangement of a valve revolving in a stationary annular track, said track having a flat valve seat at one end, accessory tightening members at the opposite end of said track, said accessory members revolving with the valve and stationary tightening surfaces at the sides of said track, said revolving tightening members being adapted to press against said stationary surfaces of said track to effect an air tight seal.

19. In an internal combustion engine, an annular track having a flat valve seat at one end of said track, a cylindrical valve having an annular chamber extending into said track and revolubly bearing on said seat, space between said track and valve being provided to permit lateral expansion of said valve, and an air tight seal at the opposite end of said track.

20. In an internal combustion engine according to claim 19, in which the space between said walls of track and valve is so small that the escape of gases and the pressure tending to lift the valve from its seat during compression and explosion are reduced to a minimum.

21. In an internal combustion engine according to claim 18, in which resilient vertical packing members are provided between the walls of said valve body and the circumferential walls of the track, which permit lateral expansion of said valve.

22. In an internal combustion engine, a stationary annular track formed with flat valve seats and having parts projecting from its circumferential walls, packing members resiliently borne in said parts, an annular valve body revolubly mounted in said track and formed with lateral flanges adapted to bear on said seats and form with the latter an air tight seal on top, means on the bottom of said valve adapted to tightly bear against said projecting parts and around the walls of said valve body to form an air tight seal at the bottom, said valve body being capable of expanding in all directions without affecting said air tight seals.

23. In an internal combustion engine, the combination with a multiple cylinder block, of a cylinder head adapted to be fixed to said block and having a laterally extended portion across a number of adjacent cylinders, an annular track in said cylinder head extending excentrically across the number of adjacent cylinders and through said extended portion of said head, a single annular valve revolubly borne in said track and adapted to successively control all cyclic operations in said cylinders during each revolution, said annular valve having intake and exhaust chambers divided by partitions into a number of individual compartments adapted to communicate with said cylinders, and at least two concentric annular intake leads communicating separately with said intake chambers of the valve and two exhaust leads communicating separately with said exhaust chambers of said valve body.

24. In an internal combustion engine according to claim 23, in which the two concentric intake leads are separated by annular frictionless interengaging partitions of which one is stationary and the other revolving with said valve body and which form between themselves a frictionless labyrinth seal.

25. In an internal combustion engine, the combination with a cylinder block, of a cylinder head fixed to and extended laterally from said block, a driven shaft revolubly mounted in said head and extending parallel to and laterally from said block, a single annular valve in said head for controlling all cyclic operations of said engine and fixed on said shaft, said annular valve having intake chambers and exhaust chambers divided into a number of individual compartments adapted to communicate with the cylinders of said block, and a pan-shaped body formed with at least two concentric annular intake leads communicating separately with said intake chambers of said valve, said pan-shaped body being formed with a central sleeve or boss fixed on said shaft and with an annular circumferential flange joined to the outer wall of said annular valve and forming a tight seal.

26. In an internal combustion engine the combination with a multiple cylinder block, of a cylinder head fixed to and extended laterally from said block, a driven shaft revolubly mounted in said head and extending parallel to and laterally from said block, a single annular valve in said head for controlling all cyclic operations of said engine and fixed on said shaft, said annular valve having intake chambers and exhaust chambers divided into a number of individual compartments adapted to communicate with the cylinders of said block, a pan-shaped body formed with at least two concentric annular intake heads communicating separately with said intake chambers of said valve, said pan-shaped body being formed with a central sleeve or boss fixed on said shaft and with an annular circumferential flange joined to the outer wall of said annular valve and forming a tight seal, and at least two exhaust leads which at one end separately communicate with said exhaust chambers of said valve body and are fixed to the outer wall of the latter to revolve with the latter and which at the opposite end converge in a single lead and terminate into a stationary exhaust pipe.

27. In an internal combustion engine, the combination with a cylinder block, of a cylinder head adapted to be fixed thereto and having an annular cylindrical track, and an open ended cylindrical valve formed with an annular chamber and revolubly mounted in said track to control all cyclic operation of said engine during a single revolution.

28. In an internal combustion engine, a cylinder block, a cylinder head formed with an annular cylindrical track, an annular valve revolubly mounted in said track, and adapted to control all cyclic operation of the engine during a single revolution, and means between track and valve to form a gas seal.

HENRY MANRODT.
MANFRED MANRODT.